Figure 1:
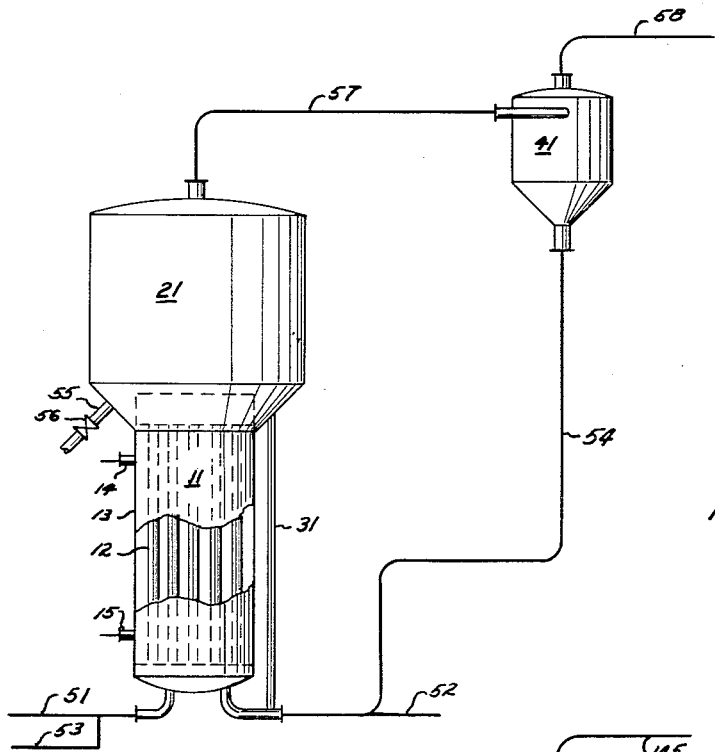

Dec. 13, 1955  F. V. CANFIELD ET AL  2,726,935
MANUFACTURE OF CHLORAMINE
Filed Dec. 22, 1954

2,726,935

MANUFACTURE OF CHLORAMINE

Frank V. Canfield, Zachary, and Louis B. Reynolds, Baton Rouge, La., assignor to Ethyl Corporation, New York, N. Y., a corporation of Delaware Application December 22, 1954, Serial No. 477,075

3 Claims. (Cl. 23—190)

This invention relates to the manufacture of chloramine. More specifically, the invention is a new and improved technique for the direct reaction of anhydrous ammonia and chlorine whereby high yields of chloramine are effectively provided and the use of aqueous solutions is avoided.

Chloramine, $NH_2Cl$, has long been known as a useful chemical product for use as a germicide component, or for subsequent use in the manufacture of hydrazine, $NH_2NH_2$. Generally, chloramine is produced by the reaction of an aqueous metal hypochlorite solution with aqueous ammonia. However, aqueous processes generally are subject to the disadvantage that the ultimate product is provided as a very dilute aqueous solution and presents an expensive recovery operation. Although it has been known that anhydrous chloramine can be reacted further with an excess of ammonia to produce hydrazine, as far as can be determined, chloramine has not been produced on any large scale by an anhydrous process.

An object of the present process is to provide a new and improved process for the direct synthesis of gaseous, anhydrous chloramine from ammonia and chlorine. A further object is to provide an improved reaction technique wherein the copious amount of heat evolved is efficiently removed. An additional object is to provide a combined reaction and recovery technique wherein a solid by-product of the process is recovered and concurrently used to improve the reaction proper. A further object of the process is to provide a chloramine product suitable for subsequent further processing to produce hydrazine.

Generally, the process of the invention comprises reacting chlorine and anhydrous ammonia gas in the presence of finely sub-divided ammonium chloride suspended in the reacting gases, the ammonia being provided or present in large excess over the stoichiometric requirements. The quantity of ammonium chloride employed is a multiple of the quantity which can be generated from the amount of chlorine present. Thus, dependent upon the particular conditions of operation, the amount of ammonium chloride solids will vary from at least 100 to about 2000 parts by weight to one part of chlorine by weight in the reaction zone. The reaction is carried out in elongated conduits, having a hydraulic radius of at least one-fourth inch. In all cases, the process is maintained at a relatively elevated temperature, but not over about 350° F.

As is explained in more detail hereafter, the ammonium chloride performs a dual function in the process, viz., it facilitates and expedites the temperature control of the reaction, and it provides an efficient means of recovering additional ammonium chloride generated in the reaction:

$$2NH_3(g) + Cl_2(g) \rightarrow NH_2Cl(g) + NH_4Cl(s)$$

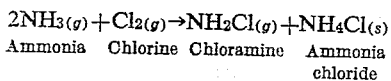

As already mentioned, a significant feature of the process is the maintenance of a large quantity of solid ammonium chloride dispersed throughout the reacting gas system, these solids serving as a temperature control means and also facilitating recovery of the additional ammonium chloride formed by providing solid-gas interfaces for deposition of the newly formed solid by-product. Two general modes of operation exist with respect to the distribution of the solids subdivided ammonium chloride maintained in the reaction space, although these modes are not sharply distinct in all process respects. By this is meant that there is, of course, a certain amount of overlapping of process conditions in these general modes. The specific characteristics of these general modes are that the subdivided ammonium chloride may be entrained in the reacting gases and carried through the reaction zone, or that the reacting gases may be passed through the solids while retaining them in the reaction zone as a fluidized bed, except for a small amount of entrained fines.

There is not a precise line of demarcation between these principle forms of the process. This is because a variation in average particle size of the ammonium chloride solids, all other conditions being unchanged, could change the character of the suspension. For most purposes, it is found that the full transport type of operation is accompanied by a solids:chlorine weight ratio of about 100:1 to 700:1, whereas the fluidized bed operation is characterized by solids:total chlorine weight ratio of about 700:1 to 2000:1.

The details of the process will be readily understood from the detailed description and examples given below, and from the figures, Figure 1 being a schematic illustration of a process wherein the reacting gases are forced through the reaction zone at a sufficiently high velocity to sweep the solids through the zone, and Figure 2 being a schematic illustration of an embodiment where the velocity of the gases in the reaction zone is restrained so that the ammonium chloride solids are retained within the reaction zone as a fluidized mass.

Referring to Figure 1, a typical installation for a transport bed system of operation is schematically illustrated. The principal units of the apparatus include a reaction section 11, a disengaging section 21, a return stand pipe 31, and a cyclone fines separator 41. The feed lines to the apparatus include a chlorine line 51, an ammonia line 52, and an inert nitrogen diluent line 53. The ammonia feed line 52 is joined to a return of fines line 54, and also provision is made for the ammonia gas being fed joining with the return stand pipe 31 for introduction of the returned solids to the reaction zone 11. The reaction zone 11 includes a multiplicity of parallel relatively small diameter reaction tubes 12, the shell of the reaction zone 13 forming an envelope around the reactor tubes 12 for contacting of a cooling medium therewith, nozzles 14, 15 being provided for circulation of said cooling medium.

The reacting gases and the entrained ammonium chloride solids pass upwardly in the interior of the reaction tubes 12 and are discharged into a disengaging space 21 which has very much greater cross sectional area than the sum of the reaction tubes 12, and hence the average velocity of the gases is greatly diminished thereby allowing the major portion of the solids present to be settled and accumulated in the separatory space 21 for return through the stand pipe 31 to the bottom of the system. A take off line 55 fitted with an appropriate valve 56 is also provided for removal of the desired portion of ammonium chloride generated from the reaction system. The gases from which the major portion of the solids have been removed are transferred from an overhead line 57 to a cyclone separator 41 for final disengaging of minor quantities of fines of ammonium chloride which are not removed by the change in velocity provided in the settling space 21. These fines are returned as already indicated through line 54 for co-mingling with the ammonia gas fed. The final reaction gas line 58 discharges product from the top of the cyclone separator 41 to a subsequent consuming operation, for example a further reaction with an additional quantity of liquid ammonia to produce hydrazine.

Figure 2:
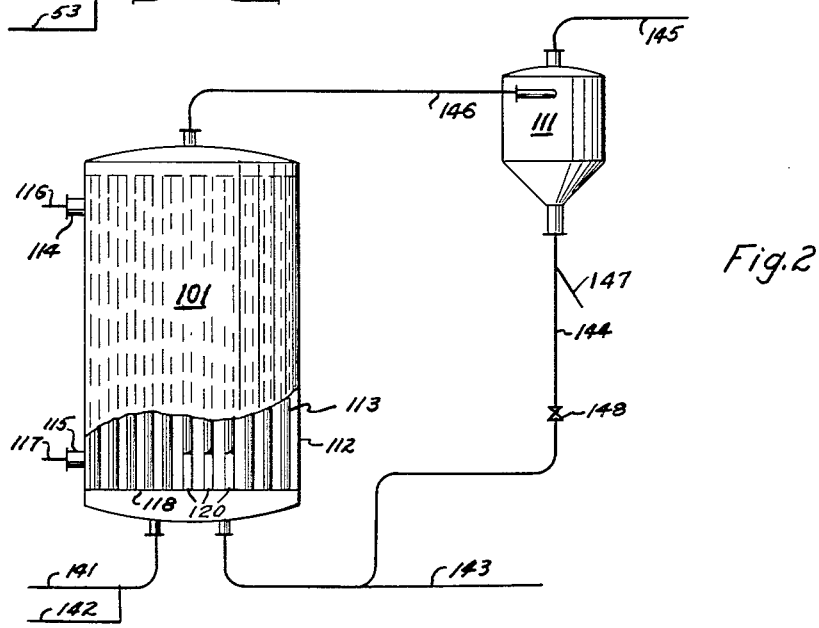

Turning to Figure 2, this diagram illustrates schematically apparatus and process flows for an embodiment using the fluidized bed technique of operation. The principal units of the plant are a reactor section 101 and a cyclone separator 111. The feed lines include a chlorine line 141, an ammonia line 143, and a line 142 for admission of nitrogen diluent when necessary. The reactor 101 includes a shell 112 enclosing a plurality of reaction tubes 113, nozzles 114, 115, and coolant lines 116, 117 provide for flow of a cooling medium in the space surrounding the reaction tubes 113 defined by the envelope 112.

A characteristic of the fluidized bed embodiment of the process is that the flow of reactants and proportions of solids present are so related that substantially no solids are discharged from the reaction tubes by the flow of the gas. A minor quantity of fines is so transported, however, and is discharged from the reactor 101 and through the overhead line 146 to the cyclone separator 111. Here the fines are disengaged and the purified gas product is discharged through line 145 to a subsequent operation. A return line 144, fitted with a control valve 148, is provided for recycle of fines to the system when necessary.

It will be seen that in the apparatus for the embodiments illustrated by both Figures 1 and 2, that the reactor section proper resembles a heat exchanger of the shell and tube type. The apparatus of Figure 2 includes a head plate 118 mounting the reactor tubes 113, and in the lower portion of the tube bundle 113, the openings in the said tubes are appreciably smaller than the internal area of the tubes. This assures that the consequent entering velocity of feed reactant gases is such that no solids will drift downwardly through the openings 120 into the open feed chamber 119 at the bottom of the reactor 101.

A particular feature of advantageous operation of a fluidized bed embodiment of the process, per Figure 2, is that conditions are readily adjusted to provide for carry over of fines of ammonium chloride corresponding in quantity to the ammonium chloride continuously being formed. Such ammonium chloride is disengaged by the cyclone and discharged from the unit through a line 147.

The merits of the process generally are that the ammonium chloride by-product is employed as a fluidized solids system which greatly facilitates the dissipation of heat generated in copious quantity from the reaction, and concurrently the fluidized solids serve as nuclei or surfaces for the deposition of fresh ammonium chloride generated. Thus extraneous catalyst, adsorptive solids and the like are not necessary in the process.

A typical illustration of an embodiment of the process providing concurrent throughput or transport of the solids is given below.

*Example I*

Chlorine and nitrogen gases are fed through lines 51 and 53, respectively, and ammonia gas is fed through line 52, the mole fractions of these components being (for the resultant mixture) 0.033, 0.48 and 0.49, respectively. The gases are passed upwardly through the tubes of the reactor 11 at an approximate superficial velocity of about 60 feet per second. A contact time of less than ½ second is provided. The tubes in addition to transporting the reacting gases also contain a fluidized mass of ammonium chloride particles averaging about 60 microns in size, or, more specifically, any portion of the solids present ranging from about 30 to 80 percent by weight as particles of 20 to 80 microns in size. The solid ammonium chloride present in the cumulative volume of the reactor tubes 12 with respect to the total chlorine present therein, is about 150 pounds to one pound of chlorine, or stated alternatively, approximately 200 moles of ammonium chloride to one mole of chlorine. The reaction space and contents are maintained at an average temperature of about 200° F. and a pressure of about 200 pounds per square inch gauge. In the extremely short contact of these components at these reaction conditions, of less than ½ second, reaction of the chlorine with the substantial excess of ammonia is virtually complete. The overhead gas discharged from the reactor through line 57 has the following approximate composition.

| | Mole fraction |
|---|---|
| Nitrogen | 0.52 |
| Ammonia NH$_3$ | 0.45 |
| Chloramine NH$_2$Cl | 0.031 |

The rapid flow of reacting gases through the reaction tubes 12 resulted in substantially concurrent movement of the solids ammonium chloride particles, into the reaction space 21 and disengaging therein, the bulk of said ammonium chloride being returned through the drop leg 31. The product was discharged from the apparatus through line 58 and contained no detectable moisture. Ammonium chloride corresponding to one pound mole per pound mole of chlorine fed was withdrawn from the disengaging space 21 through line 55.

*Example II*

Referring to Figure 2, chlorine gas, diluted with nitrogen admitted through line 142, is introduced to feed space 119 concurrently with ammonia fed through line 143. The proportions of the thus provided feed gas system are substantially the same as in Example I. The mixed gas enters the reaction tubes 113 through the orifices 120, a pressure of about 250 pounds per square inch gauge being provided in the reaction tube, and an average reaction temperature of about 250° F.

Ammonium chloride solids are maintained in the reactor tubes 113 in the proportions of about 800 pounds per pound of chlorine present; the solids having a particle size distribution approximately corresponding to the solids employed in Example I. A superficial gas velocity of about 15 feet per second is provided in the reaction tubes.

Because of the relatively low superficial gas velocity in the reaction tubes, only a minute quantity of the fines solids are carried overhead with the reacted gases, the quantity being approximately equivalent to the amount produced by the reaction. By appropriate adjustment of the return valve 148, a portion of the entrained fines is returned to the system through line 144 when necessary.

The effectiveness of the process is illustrated by the foregoing examples. Not only is the desired reaction extremely rapidly carried out, but the process is carried out entirely in the anhydrous state and without the use of extraneous catalysts or liquids.

The several operating variables of the process can individually be varied through appreciable latitude without departing from the scope of the process. However, in approaching the extremes of one variable it is sometimes necessary to alter another variable in a compensating direction. For example, although linear superficial velocities of the reacting gases can be reduced to the range of about 5 feet per second, in order to provide suspension and fluidization of the ammonium chloride, it is necesary to provide the solids in a finer particle size range.

With respect to pressure of operation it is preferred to provide a moderately elevated pressure particularly to facilitate subsequent condensation of ammonia using ordinary cooling water as a coolant. Accordingly, it is preferred to operate at pressures of 150 to about 250 pounds per square inch gauge. Similarly to the pressure conditions, the temperature can be varied widely although generally it is preferred to operate at temperatures above 200° F. and up to about 300° F. Temperatures in the upper portion of the range improve the heat removal from the reaction by increasing the temperature differential to the coolant medium. Temperatures over 350° F. should be avoided to minimize product decomposition.

The nitrogen diluent employed in the foregoing examples is very desirable but not absolutely essential. The nitrogen, or an equivalent inert gas, functions in several ways. It facilitates heat removal from the system and it also moderates the vigor of the reaction. Because of very high reactivity of chlorine with respect to the reaction with ammonia gas, it tends to react beyond the desired chloramine product and form nitrogen trichloride. The dilution of the chlorine even at the time of initial contact minimizes the tendency to form degradation products. The function of the nitrogen can be provided by appropriate adjustment of the proportions of ammonia gas. Generally, it is found most economical to provide sufficient nitrogen to assure velocities for the desired fluidizing or suspension of the solids, but not to dilute the ammonia so greatly that subsequent recovery with water cooling, and with a high degree of recovery is not possible. Preferred proportions of nitrogen or other inert gas are up to volumetric concentrations equal to the ammonia concentration.

The chlorine concentration in the reactant gases fed can also be varied considerably. Generally, it is found preferable to maintain the chlorine proportions from 0.02 to about 0.10 mole per mole of ammonia gas fed. Proportions below this range demand excessive throughput for a given unit of production; quantities in excess of these proportions tend to exceed the heat dissipation capacities available, and the temperature of operation tends to exceed 350° F., which results in loss of product by thermal decomposition.

In prior processes, particularly those such as the Raschig process, which was carried out in an aqueous medium, it was found necessary to provide glue to act as an inhibitor and subsequent utilizing operations such as the manufacture of hydrazine. In order to prevent the introduction of ions of iron or copper through corrosion of equipment in the present chloramine process, it is preferred to employ stainless steel or aluminum clad steel for the apparatus.

Having described the process in full detail and its preferred embodiments, what is desired to claim is:

1. The process of manufacture of an anhydrous chloramine gaseous product comprising feeding chlorine gas and ammonia gas, in the proportions of 0.02 mole to 0.10 mole of chlorine per mole of ammonia, to an extended reaction zone having a hydraulic radius of not less than one-fourth inch, and suspending finely divided ammonium chloride solids in said gases which reacting at a pressure of at least 150 pounds per square inch and at a temperature of not over about 350° F., the ammonium chloride solids being suspended in the proportions of from 100 to 2000 parts by weight to one part by weight of the total free chlorine in the reaction zone.

2. The process of manufacture of an anhydrous chloramine gaseous product comprising forming a gas-solids stream comprising chlorine and ammonia, in the proportions of 0.02 mole to 0.10 mole of chlorine per mole of ammonia, and finely divided ammonium chloride, passing said stream through an extended reaction zone at a temperature of from about 200 to 300° F. and at a pressure of 150 to 250 pounds per square inch, and reacting the chlorine with ammonia, the reaction zone having a hydraulic radius of not less than about one-fourth inch, then disengaging the ammonium chloride solids and recycling sufficient ammonium chloride solids to said reaction zone to maintain therein a solids:total free chlorine weight ratio of from about 100:1 to 700:1.

3. The process of manufacture of an anhydrous chloramine gaseous product comprising feeding chlorine gas and ammonia gas, in the proportions of 0.02 mole to 0.10 mole of chlorine per mole of ammonia, to an extended reaction zone having a hydraulic radius of not less than about one-fourth inch, reacting therein at a temperature of from about 200° to 300° F. and at a pressure of 150 to 250 pounds per square inch, and suspending finely divided ammonium chloride solids therein, the ammonium chloride solids being suspended in the proportions of from 700 to 2000 parts by weight to one part by weight of the total free chlorine in the reaction zone.

References Cited in the file of this patent
UNITED STATES PATENTS

| | | |
|---|---|---|
| 1,480,166 | Joyner | Jan. 8, 1924 |
| 2,118,904 | Staudt et al. | May 31, 1938 |

FOREIGN PATENTS

| | | |
|---|---|---|
| 22,957 | Great Birtain | 1907 |